(12) United States Patent
Edel et al.

(10) Patent No.: US 11,295,878 B2
(45) Date of Patent: Apr. 5, 2022

(54) PTC THERMISTOR MODULE FOR A TEMPERATURE CONTROL DEVICE

(71) Applicant: Mahle International GmbH, Stuttgart (DE)

(72) Inventors: Nicolas Edel, Soultz-Haut-Rhin (FR); Gilles Magnier, Rougemont-le-Chateau (FR); Eric Marlier, Kolbsheim (FR); Pascal Miss, Selestat (FR); Jerome Stoeckel, Bollwiller (FR); Falk Viehrig, Stuttgart (DE)

(73) Assignee: Mahle International GmbH

( * ) Notice: Subject to any disclaimer, the term of this patent is extended or adjusted under 35 U.S.C. 154(b) by 0 days.

(21) Appl. No.: 17/168,164

(22) Filed: Feb. 4, 2021

(65) Prior Publication Data

US 2021/0241945 A1 Aug. 5, 2021

(30) Foreign Application Priority Data

Feb. 5, 2020 (EP) .................................... 20155602

(51) Int. Cl.
*H01C 1/14* (2006.01)
*H01C 1/08* (2006.01)
(Continued)

(52) U.S. Cl.
CPC ............. *H01C 1/1406* (2013.01); *H01C 1/08* (2013.01); *H01C 7/021* (2013.01); *H01C 7/13* (2013.01); *H05B 3/48* (2013.01); *H05B 2203/02* (2013.01)

(58) Field of Classification Search
CPC .......... H01C 1/1406; H01C 1/08; H01C 1/84; H01C 7/021; H01C 7/13; H05B 3/48
See application file for complete search history.

(56) References Cited

U.S. PATENT DOCUMENTS 7,064,301 B2 * 6/2006 Han ..................... F24H 3/0405
219/202
8,481,899 B2 * 7/2013 Jun ......................... H05B 3/50
219/544
(Continued)

FOREIGN PATENT DOCUMENTS

EP 3562263 A1 10/2019
EP 3584808 A1 12/2019
(Continued)

OTHER PUBLICATIONS

English abstract for KR-1020040046879.

*Primary Examiner* — Kyung S Lee
(74) *Attorney, Agent, or Firm* — Fishman Stewart PLLC

(57) ABSTRACT

A PTC thermistor module for a temperature control device may include at least one PTC thermistor element, two electrically insulating insulator plates, and a plurality of electrical conductors. The PTC thermistor element may have a flat element cross section, two opposing large outer surfaces, and two opposing small outer surfaces connecting the two large outer surfaces. The two insulator plates may be respectively connected to one of the two large outer surfaces. The plurality of electrical conductors may be configured as a plurality of electrically conductive conductor coatings, which may each be disposed on an associated insulator plate of the two insulator plates. At least one first conductor coating may be electrically connected to a first large outer surface of the two large outer surfaces. At least two second conductor coatings may be electrically connected to a second large outer surface of the two large outer surfaces.

20 Claims, 7 Drawing Sheets

(51) Int. Cl.
*H01C 7/02* (2006.01)
*H01C 7/13* (2006.01)
*H05B 3/48* (2006.01)

(56) References Cited

U.S. PATENT DOCUMENTS

| | | | |
|---|---|---|---|
| 9,863,663 B2* | 1/2018 | Kohl | F24H 9/12 |
| 10,804,013 B2* | 10/2020 | Tseng | H02H 9/026 |
| 2004/0108936 A1 | 6/2004 | Han et al. | |
| 2015/0090427 A1* | 4/2015 | Brandauer | H01M 10/6556 |
| | | | 165/64 |
| 2015/0124366 A1 | 5/2015 | Tseng et al. | |
| 2019/0084374 A1* | 3/2019 | Min | H05B 1/02 |
| 2019/0335541 A1* | 10/2019 | Marlier | F24H 9/1872 |

FOREIGN PATENT DOCUMENTS

| | | |
|---|---|---|
| GB | 2033709 A | 5/1980 |
| KR | 1020040046879 | 6/2004 |

\* cited by examiner

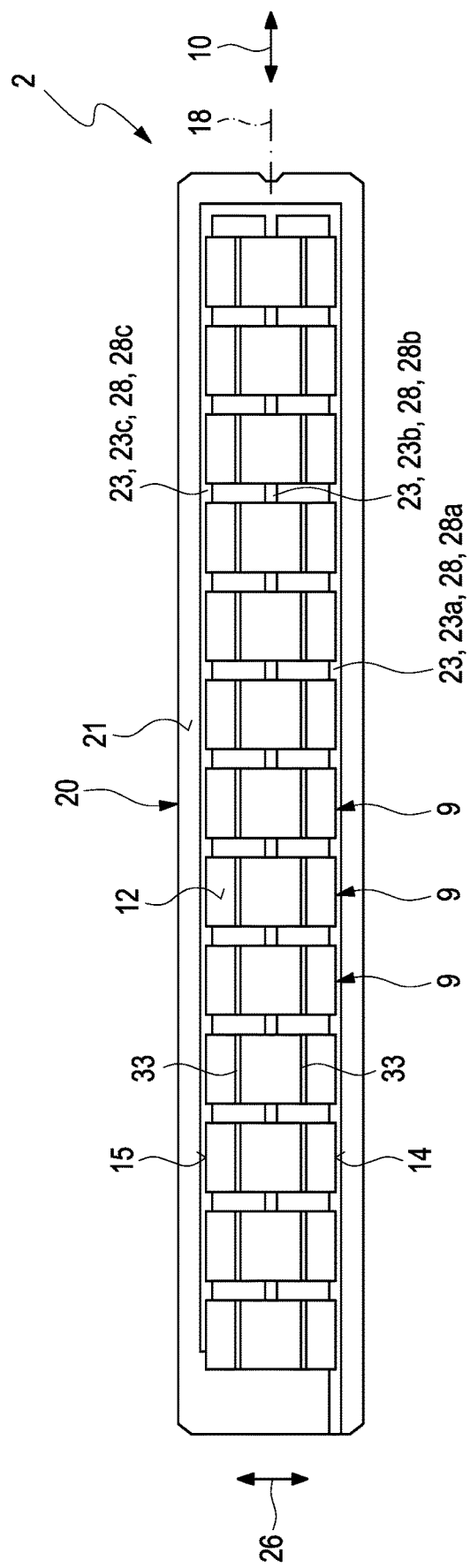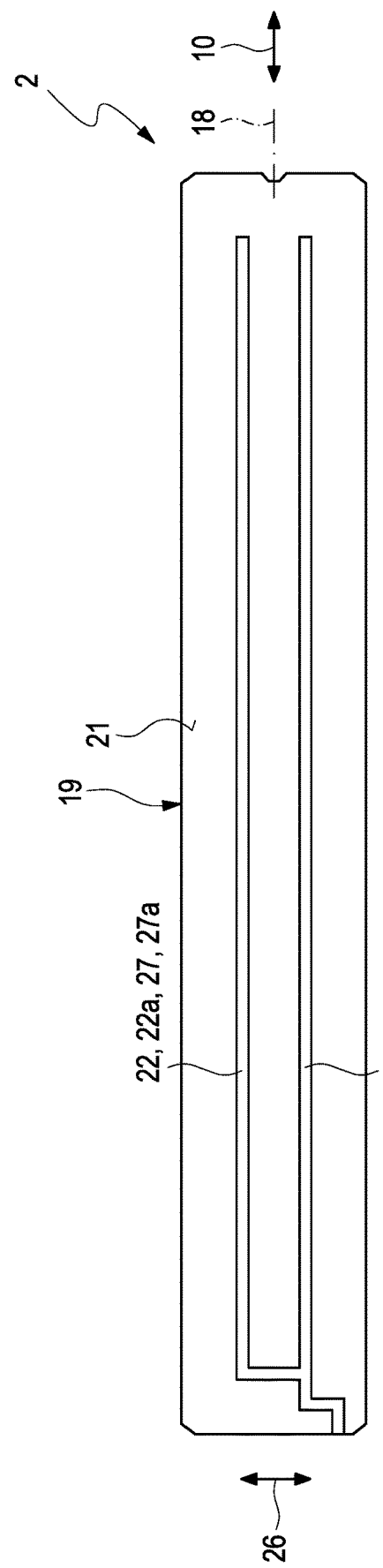

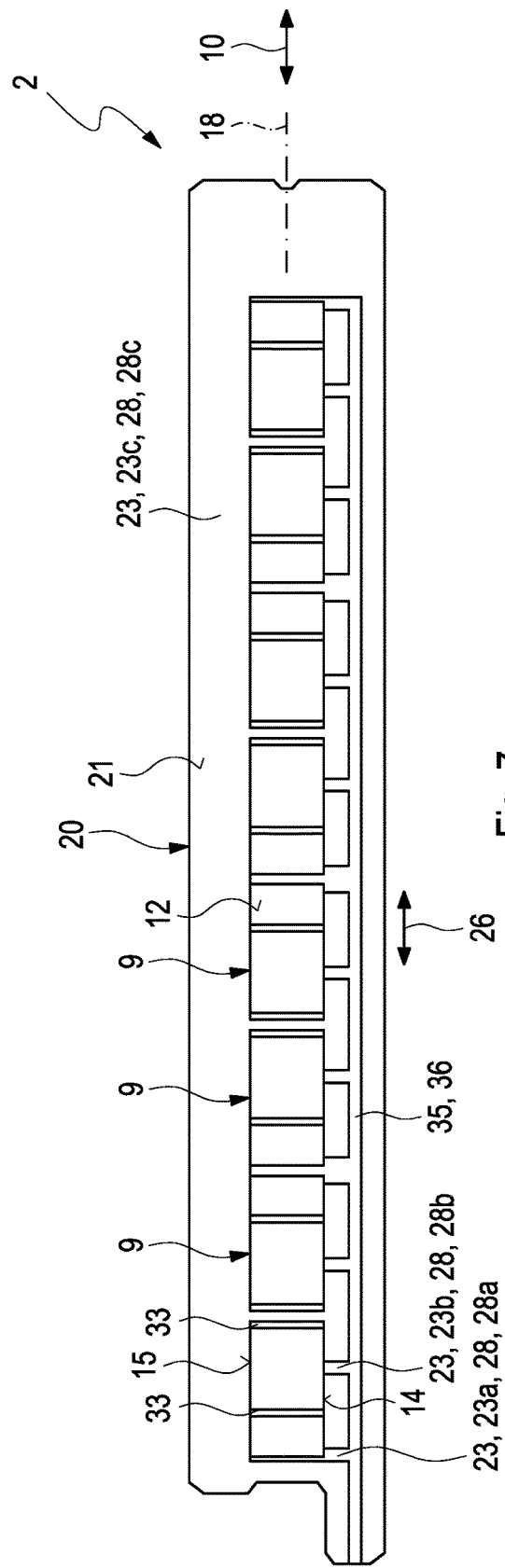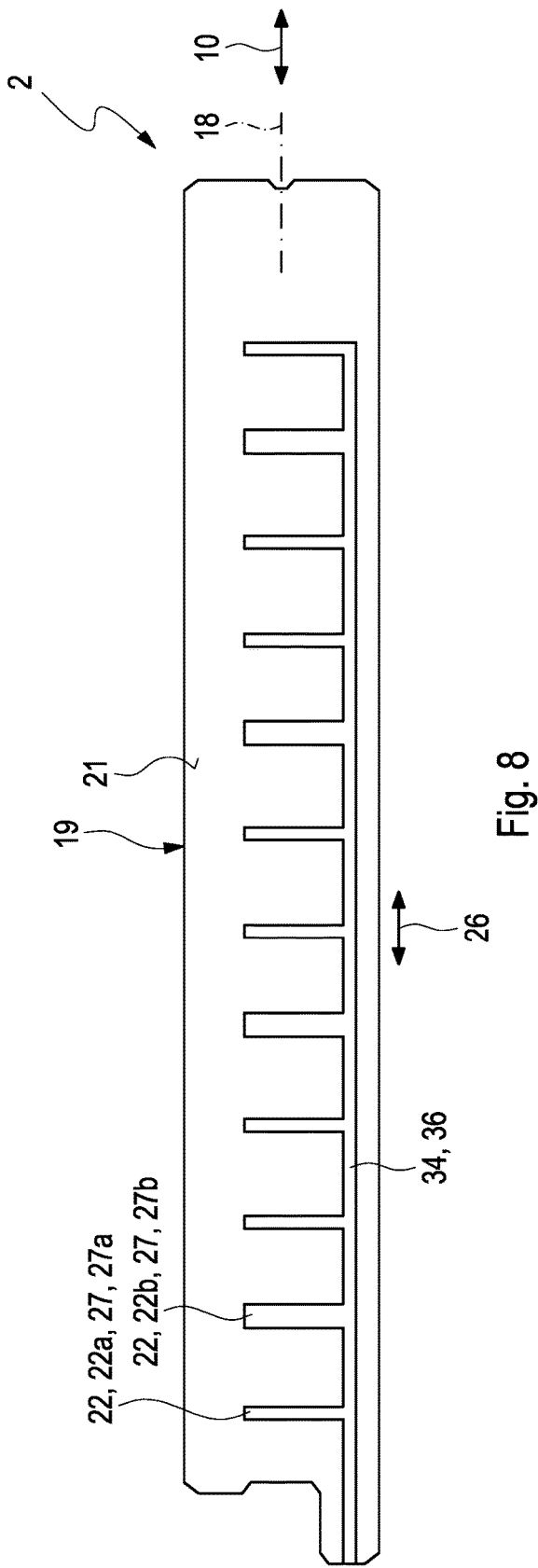

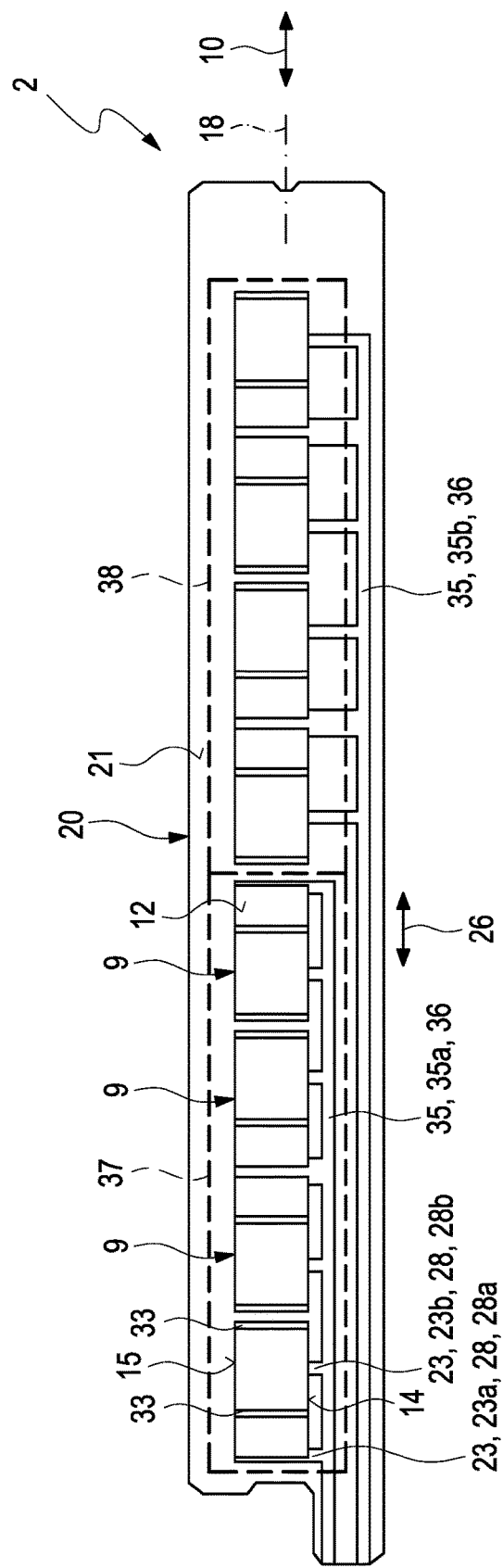
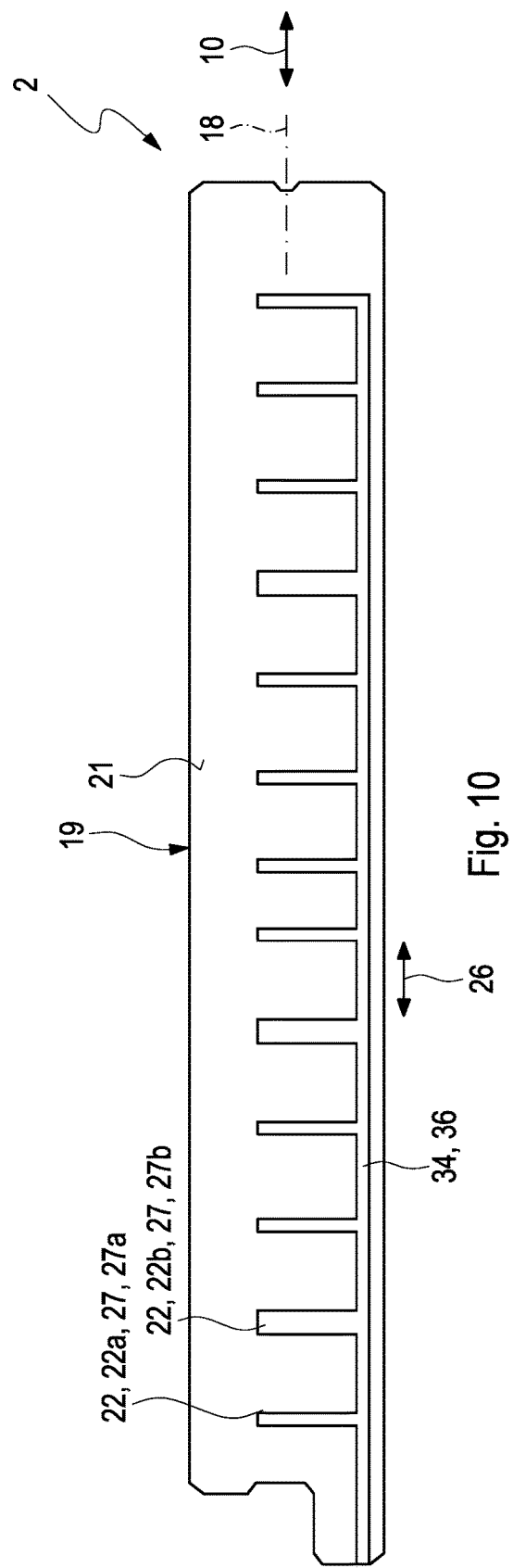

PTC THERMISTOR MODULE FOR A TEMPERATURE CONTROL DEVICE

CROSS-REFERENCE TO RELATED APPLICATIONS

This application claims priority to European Patent Application No. EP 20155602.4, filed on Feb. 5, 2020, the contents of which is hereby incorporated by reference in its entirety.

TECHNICAL FIELD

The present invention relates to a PTC thermistor module for a temperature control device, comprising at least one PTC thermistor element and also electrically insulating insulator plates, on which electrical conductors are formed by an electrically conductive conductor coating. The invention furthermore relates to a temperature control device comprising at least one such PTC thermistor module.

BACKGROUND

A temperature control device serves for controlling the temperature of a fluid or an object, i.e. for heating and/or cooling same. It is known to use PTC thermistor modules in a temperature control device for heating purposes. Such a PTC thermistor module usually comprises a plurality of PTC thermistor elements through which a current flows during operation as a result of an electrical voltage being applied and which generate heat in the process. Such PTC thermistor elements, also called PTC element, where PTC stands for "Positive Temperature Coefficient", are often used in temperature control devices owing to their self-regulating property.

Simple production and efficient operation of the PTC thermistor module are afforded by a flat design of the PTC thermistor elements. The flat design has the effect that the PTC thermistor element has two large outer surfaces and two small outer surfaces in a longitudinal direction of the PTC thermistor module or of the PTC thermistor element. The large outer surfaces face away from one another. The small outer surfaces also face away from one another, wherein they connect the large outer surfaces to one another.

One such PTC thermistor module is known from EP3562263A1. In EP3562263A1, the electrical supply of the PTC thermistor elements is realized by way of conductor coatings on insulator plates arranged on the large outer surfaces of the PTC thermistor elements. In this case, a first conductor coating is applied at the edge on one of the outer surfaces and another conductor coating is applied at the edge diagonally oppositely on the other outer surface. The electric current thus flows through the PTC thermistor element virtually diagonally.

During the operation of the PTC thermistor modules, the diagonal flow through the respective PTC thermistor element leads to the production of a local region having an increased temperature relative to adjacent and other regions of the PTC thermistor element. This local region having the increased temperature, also known as a so-called "hot spot", has the effect that the electrical resistance in the region of the hot spot is greater than the surrounding regions, such that the flow through the PTC thermistor element ultimately is adversely affected by the hot spot. This results in a reduced efficiency of the respective PTC thermistor element and thus of the associated PTC thermistor module. The reduction of efficiency increases when there is an increase in the operating voltages of the PTC thermistor module and thus in the electrical voltage present at the PTC thermistor element. Moreover, on account of the undesired increased temperatures occurring during operation, the hot spot can lead to damage to adjacent parts of the PTC thermistor module and/or of the temperature control device.

SUMMARY

The present invention therefore addresses the problem of specifying, for a PTC thermistor module of the type mentioned in the introduction and also for a temperature control device comprising such a PTC thermistor module, improved or at least different embodiments distinguished in particular by an increased efficiency and/or an improved operational reliability.

This problem is solved according to the invention by means of the subject matter of the independent claim(s). The dependent claim(s) relate to advantageous embodiments.

The present invention is based on the general concept of electrically contacting and supplying a flat PTC thermistor element in a PTC thermistor module at the large outer surfaces of the PTC thermistor element in such a way that a current path for the electric current is provided between the large outer surfaces of the PTC thermistor element, facing away from one another, said current path having at least two sections which run between the large outer surfaces and are spaced apart from one another. A virtually zigzag course of the current path of the electric current is thus realized. This has the effect that along the current path in the respective section between the large outer surfaces, facing away from one another, an associated region having increased temperature, also known as a "hot spot", arises, with the result that there are at least two hot spots in the PTC thermistor element during operation. The increase in the number of hot spots within the PTC thermistor element has the effect that the respective hot spot has a reduced temperature in comparison with the single hot spot manifested in the prior art. This results in a more homogeneous temperature distribution within the PTC thermistor element, such that the efficiency of the PTC thermistor element is not restricted by a single hot spot. Consequently, the PTC thermistor element and thus the associated PTC thermistor module can be operated more efficiently, even when electrical operating voltages rise. Moreover, the zigzag course of the current path of the electric current makes it possible to lengthen the current path within the PTC thermistor element, with the result that the efficiency of the PTC thermistor element is in turn increased. The more homogeneous temperature distribution within the PTC thermistor element furthermore has the effect that the PTC thermistor element has no or at least fewer local regions having increased temperatures which can impair or damage adjacent parts and/or applications. Consequently, an increased operational reliability is thus afforded.

In accordance with the concept of the invention, the PTC thermistor module comprises at least one PTC thermistor element. The PTC thermistor element is referred to as PTC element, wherein PTC stands for "Positive Temperature Coefficient". The PTC thermistor element has a flat element cross section transversely with respect to a longitudinal direction of the PTC thermistor module or of the PTC thermistor element, also called module longitudinal direction hereinafter. The PTC thermistor element thus has two large outer surfaces, namely a first large outer surface and a second large outer surface, facing away from one another, along the module longitudinal direction. Moreover, along the module longitudinal direction, the PTC thermistor element has two small outer surfaces, namely a first small outer surface and a second small outer surface, facing away from one another. In this case, the small outer surfaces connect the large outer surfaces to one another. The PTC thermistor module furthermore comprises two electrically insulating insulator plates, which extend in the module longitudinal direction and are respectively connected to one of the large outer surfaces of the respective PTC thermistor element in a heat-transferring manner. Moreover, the PTC thermistor module comprises electrical conductors spaced apart from one another, said electrical conductors being embodied in each case as a conductor coating, wherein the respective conductor coating is formed on an associated one of the insulator plates. That is to say that the respective conductor coating is formed in particular by a coating of the associated insulator plate. According to the invention, the PTC thermistor module comprises at least three such conductors spaced apart from one another and formed in each case by an electrically conductive conductor coating on an associated one of the insulator plates. In this case, at least one of the conductor coatings is electrically connected to one of the large outer surfaces, for example the first large outer surface. Moreover, at least two other conductor coatings are electrically connected to the other large outer surface, for example to the second large outer surface, of the respective PTC thermistor element. That is to say that on one of the large outer surfaces, at least one electrical contact is provided by the associated conductor coating, and on the large outer surface facing away, at least two electrical contacts are provided by the associated conductor coatings, wherein the conductor coatings and thus the electrical contacts are in each case spaced apart from one another. Thus, along the large outer surfaces, the conductor coatings are electrically connected alternately to the first large outer surface and the second large outer surface. This results in the above-described, virtually zigzag course of the current path of the electric current through the PTC thermistor element during the operation of the PTC thermistor module.

It is assumed below that the first large outer surface is electrically connected to at least one associated conductor coating and the second large outer surface is electrically connected to at least two associated conductor coatings. It goes without saying, however, that an opposite electrical contacting, that is to say the connection of the first large outer surface to at least two associated conductor coatings and of the second large outer surface to at least one associated conductor coating is analogously also possible and likewise belongs to the scope of this invention.

The flat element cross section expediently has two long or large outer sides and two short or small outer sides connecting the two large outer sides to one another. In this case, the large outer sides in the element cross section lie in the large outer surfaces of the PTC thermistor element, while the small outer sides in the element cross section lie in the small outer surfaces of the PTC thermistor element. In this case, a "flat" element cross section is understood to mean a cross section in which the large outer sides are at least double the size of the small outer sides. Preferably, the large outer sides are at least five times larger than the small outer sides.

The PTC thermistor module advantageously comprises at least two PTC thermistor elements of this type which are arranged successively, advantageously in the module longitudinal direction. Preferably, the PTC thermistor elements are spaced apart from one another, in particular in the module longitudinal direction.

Preference is given to embodiments in which the conductor coatings associated with the respective large outer surface each have an associated electrical polarity during operation. That is to say, for example, that the conductor coatings electrically connected to the first large outer surface of the respective PTC thermistor element have a first electrical polarity during operation. By contrast, the conductor coatings electrically connected to the second large outer surface of the respective PTC thermistor element have a second electrical polarity during operation. It is thus preferred if there is one electrical polarity per PTC thermistor element and large outer surface. This has the effect that, during operation, there are no electric currents along the large outer surfaces or such currents are at least reduced. The current path through the PTC thermistor element is thus lengthened and the efficiency of the PTC thermistor module is thus increased. The electrical polarity of the conductor coatings can be realized by means of a corresponding electrical contacting of the conductor coatings and/or by means of corresponding interconnection in the associated temperature control device.

Preferably, the conductor coatings connected to the first large outer surfaces of all the PTC thermistor elements have the first polarity and the conductor coatings connected to the second large outer surfaces of all the PTC thermistor elements have the second polarity. Consequently, the production and assembly of the PTC thermistor module can be simplified and the PTC thermistor module can be operated more efficiently.

The conductor coatings electrically connected to the large outer surfaces are expediently spaced apart from one another along the large outer surfaces. In this case, the conductor coatings can be spaced apart from one another arbitrarily, in principle, along the large outer surfaces.

It is preferred if all conductor coatings electrically connected to the large outer surfaces of the respective PTC thermistor element are spaced apart from one another along an common or identical spacing direction. Consequently, in particular, a more uniform flow through the PTC thermistor element is implemented along the entire extent of the PTC thermistor element, thus giving rise to an increased efficiency and/or a more homogeneous temperature distribution within the PTC thermistor element.

It is preferred if the extent of the respective conductor coating along the spacing direction is smaller than the spacing between the conductor coatings in the spacing direction. Consequently, the section of the current path of the electric current between the conductor coatings and thus within the PTC thermistor element is lengthened. This results in an increased efficiency of the PTC thermistor element and thus of the associated PTC thermistor module. It is preferred here if the spacing between successive conductor coatings in the spacing direction corresponds to at least triple the extent of the respective conductor coating.

Embodiments prove to be advantageous in which one of the conductor coatings is arranged on the associated insulator plate only in a first edge region adjoining one of the small outer surfaces, for example the first small outer surface. By contrast, another of the conductor coatings is arranged on the associated insulator plate only in a second edge region adjoining the other small outer surface, for example the second small outer surface. This results in a maximization or at least enlargement of the current path of the electric current through the PTC thermistor element and thus in an increased efficiency of the PTC thermistor module.

Simplified production of the PTC thermistor module in conjunction with an increased efficiency and operational reliability can be achieved if the respective conductor coating extends in the module longitudinal direction. In this way, the conductor coatings can be coated and thus applied in a simple manner on the respectively associated insulator plate. Moreover, it is thus possible to connect the same conductor coating to associated large outer surfaces of at least two PTC thermistor elements of the PTC thermistor module which succeed one another in the module longitudinal direction.

Alternatively, it is conceivable for the respective conductor coating to extend transversely or at an inclination with respect to the module longitudinal direction, wherein at least two of the conductor coatings, preferably the conductor coatings applied on the same large outer surfaces project from a common, electrically conductive base section and are electrically connected to one another by the base section. Preferably, the base section is likewise a coating on the associated insulator plate, wherein the base section can run in a manner spaced apart from the respective PTC thermistor module, advantageously in the module longitudinal direction.

It goes without saying that embodiments are also conceivable in which at least one of the conductor coatings extends in the module longitudinal direction and another of the conductor coatings extends transversely or at an inclination with respect to the module longitudinal direction.

In principle, the first large outer surface can be electrically connected to just one conductor coating and the second large outer surface can be electrically connected to two other conductor coatings.

Embodiments are also conceivable in which both the first large outer surface and the second large outer surface are electrically connected in each case to at least two associated conductor coatings. Increasing the number of conductor coatings electrically connected to the respective large outer surface increases the number of sections of the current path and thus reinforces the zigzag course of the current path of the electric current through the PTC thermistor element. Accordingly, the number of hot spots within the PTC thermistor element also increases as the number of respectively associated conductor coatings rises. The increase in the number of hot spots furthermore results in a more homogeneous temperature distribution within the PTC thermistor element during operation of the PTC thermistor module.

In accordance with one possible embodiment, the PTC thermistor module comprises at least two successive PTC thermistor elements, spaced apart from one another in particular in the module longitudinal direction. In this case, the PTC thermistor elements are subdivided into two groups, wherein the respective group comprises at least one PTC thermistor element. That is to say that the PTC thermistor module comprises a first group of PTC thermistor elements having at least one PTC thermistor element and a second group of PTC thermistor elements having at least one other PTC thermistor element, said second group being different from the first group. In this case, the conductor coatings for the first group that are electrically connected to one of the large outer surfaces are electrically isolated from the conductor coatings for the second group that are electrically connected to the same large outer surfaces. That is to say that for example the conductor coatings electrically connected to the first large outer surface of the PTC thermistor elements of the first group are electrically isolated from the conductor coatings electrically connected to the first large outer surfaces of the PTC thermistor elements of the second group. This allows an independent electrical supply of the PTC thermistor elements of the first group and of the PTC thermistor elements of the second group. In this case, the conductor coatings electrically connected to the other large outer surface can be electrically connected to one another or likewise electrically isolated from one another.

The electrical connection of the respective conductor coating to the associated large outer surface can be realized in any desired manner, in principle.

It is preferred if the respective PTC thermistor element has an electrically conductive metal coating on the respective large outer surface in the region of the respectively associated conductor coating, said metal coating being electrically conductively connected to the associated conductor coating. The PTC thermistor module can thus be produced simply and cost-effectively. A reliable and simple electrical connection between the respective large outer surface and the respectively associated conductor coating in conjunction with a small structural size, in particular a thickness running through the large outer surfaces, is realized at the same time.

It is preferred if the metal coating is arranged in each case only in the region of the associated conductor coating. That is to say that at least one metal coating or at least two metal coatings spaced apart from one another is or are provided only locally on the respective large outer surface. An electric current along the large outer surfaces is thus prevented or at least reduced. This results in an increased efficiency of the PTC thermistor module.

It is advantageous if the respective conductor coating is soldered to the associated metal coating. In this way, the PTC thermistor module can be produced by arranging the insulator plates on the at least one PTC thermistor module and then jointly soldering the conductor coatings to the associated metal coatings.

The PTC thermistor module advantageously comprises an enveloping body enclosing the respective PTC thermistor element at least in a peripheral direction. In this case, the peripheral direction runs around the longitudinal central axis of the PTC thermistor module, in particular around the module longitudinal direction. This results in simplified handling of the PTC thermistor module and/or improved protection of the insulator plates and/or of the PTC thermistor elements of the PTC thermistor module.

It is preferred if the enveloping body is connected to the insulator plates in a heat-transferring manner. Improved heat transfer from the PTC thermistor element towards the outside is thus effected. It is advantageous here if the respective insulator plate is configured as thermally conductive. In particular, the respective insulator plate can be a ceramic plate.

Advantageously, the respective insulator plate is connected in a planar and heat-transferring manner by a plate outer side, facing away from the respective PTC thermistor element, at a body inner side of the enveloping body, facing the PTC thermistor element. A direct contact between the respective insulator plate and the enveloping body can be provided in this case. Likewise, a thermally conductive paste and/or a thermally conductive film can be arranged between the respective insulator plate and the enveloping body.

It goes without saying that, besides the PTC thermistor module, a temperature control device comprising such a PTC thermistor module also belongs to the scope of this invention. The temperature control device here comprises, besides the at least one PTC thermistor module, a control device, by which the respective PTC thermistor module is electrically driven during operation.

The temperature control device is used in particular for regulating the temperature of a fluid, for example in a motor vehicle.

For this purpose, the temperature control device can comprise a plurality of such PTC thermistor modules arranged next to one another in a heat exchanger region. The fluid whose temperature is to be regulated is able to flow through the heat exchanger region, in particular between the adjacent PTC thermistor modules. In this case, a cooling rib for enlarging the area that exchanges heat with the fluid whose temperature is to be regulated can be arranged between adjacent PTC thermistor modules.

The PTC thermistor modules can form a heat exchanger block, through which the fluid whose temperature is to be regulated can flow, wherein the control device is arranged laterally on the heat exchanger block. Consequently, the respective PTC thermistor module can be electrically connected to the control device in a simplified and compact manner.

Further important features and advantages of the invention are evident from the dependent claims, from the drawings and from the associated description of the figures with reference to the drawings.

It goes without saying that the features mentioned above and those yet to be explained below are usable not only in the combination respectively indicated, but also in other combinations or by themselves, without departing from the scope of the present invention.

Preferred exemplary embodiments of the invention are illustrated in the drawings and are explained in greater detail in the following description, wherein identical reference signs refer to identical or similar or functionally identical components.

BRIEF DESCRIPTION OF THE DRAWINGS

In the figures, in each case schematically:

FIG. 3 shows a plan view of the PTC thermistor module in the direction denoted III in FIG. 2 without an enveloping body and without one insulator plate, FIG. 4 shows a plan view of the PTC thermistor module in the direction denoted IV in FIG. 3, without an enveloping body and without one insulator plate visible, FIG. 7 shows the view from FIG. 3 in the case of a further exemplary embodiment, FIG. 8 shows the view from FIG. 4 in the case of the exemplary embodiment from FIG. 7, FIG. 9 shows the view from FIG. 7 in the case of another exemplary embodiment, FIG. 10 shows the view from FIG. 8 in the case of the exemplary embodiment from FIG. 9.

DETAILED DESCRIPTION

Figure 1:
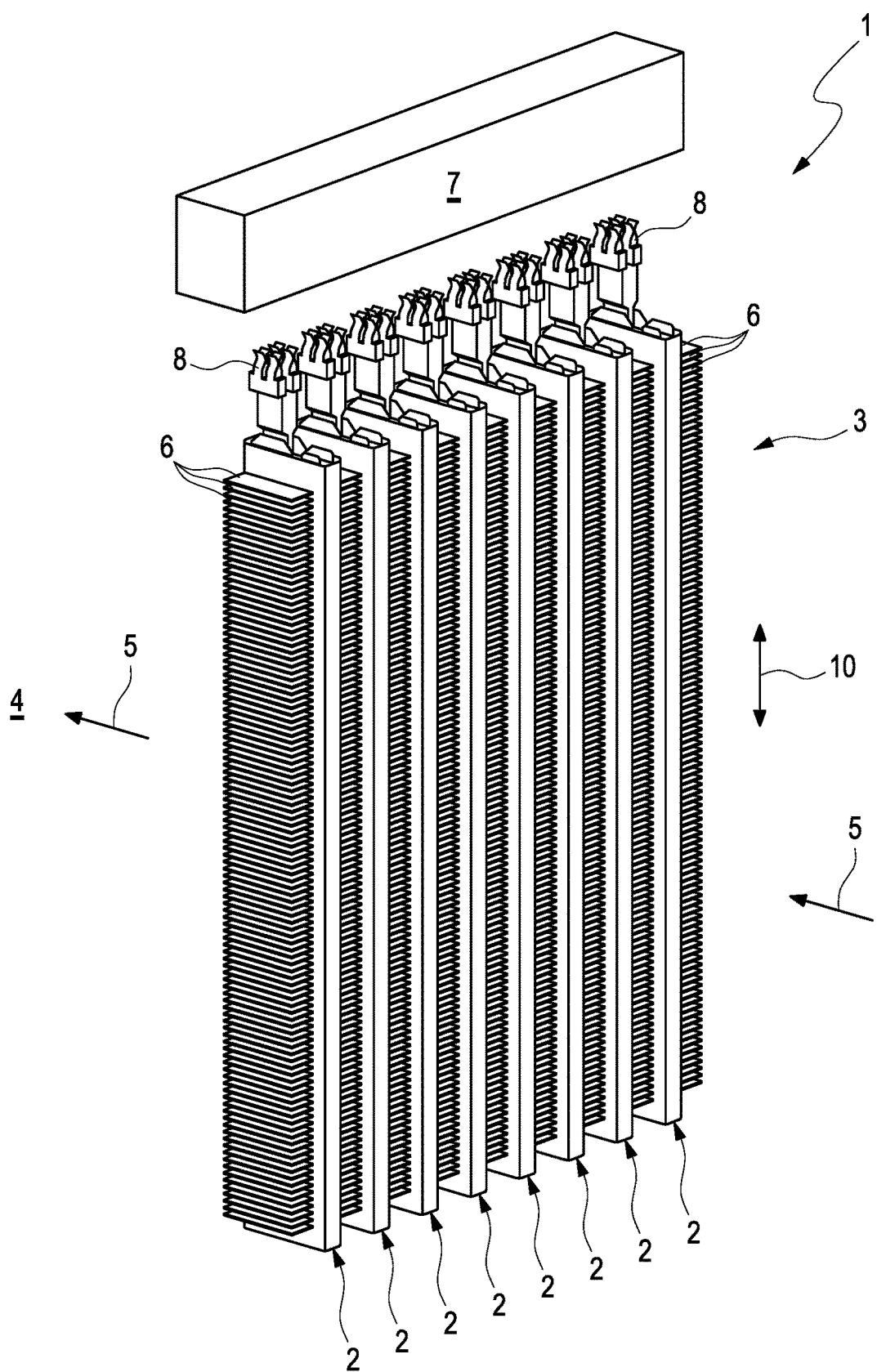
FIG. 1 shows an isometric view of a temperature control device with PTC thermistor modules.

A temperature control device 1 such as is shown by way of example in FIG. 1 comprises at least one PTC thermistor module 2 such as is shown for example in FIGS. 2 to 10. The temperature control device 1 shown in FIG. 1 comprises a plurality of PTC thermistor modules 2, which are combined to form a heat exchanger block 3. For this purpose, the PTC thermistor modules 2 are arranged next to one another in a heat exchanger region 4. A fluid 5 is able to flow through the heat exchanger region 4, said fluid 5 undergoing temperature control, in particular being heated, as it flows through the heat exchanger region 4 and during operation of the temperature control device 1. Cooling ribs 6 are arranged between the PTC thermistor modules 2 of the temperature control device 1 shown, the fluid 5 being able to flow through said cooling ribs and the latter being connected to the PTC thermistor modules 2 in a heat-transferring manner. The cooling ribs 6 extend in each case between adjacent PTC thermistor modules 2 and on the outside of the outer PTC thermistor modules 2. The temperature control device 1 furthermore comprises a control device 7, by which the PTC thermistor modules 2 are electrically driven. The control device 7 can in particular individually activate and deactivate the individual PTC thermistor modules 2. Zone control can likewise be realized. For the electrical connection to the control device 7, the respective PTC thermistor module 2 comprises electrical terminals 8.

In accordance with FIGS. 2 to 10, the PTC thermistor module 2 comprises at least one PTC thermistor element 9. In the exemplary embodiments shown, the respective PTC thermistor module 2 comprises a plurality of such PTC thermistor elements 9, which are arranged one behind another in a longitudinal direction 10 of the module 2, also called module longitudinal direction 10 hereinafter. The PTC thermistor elements 9 consist of material having a positive temperature coefficient and are therefore also referred to as PTC elements.

Figure 2:
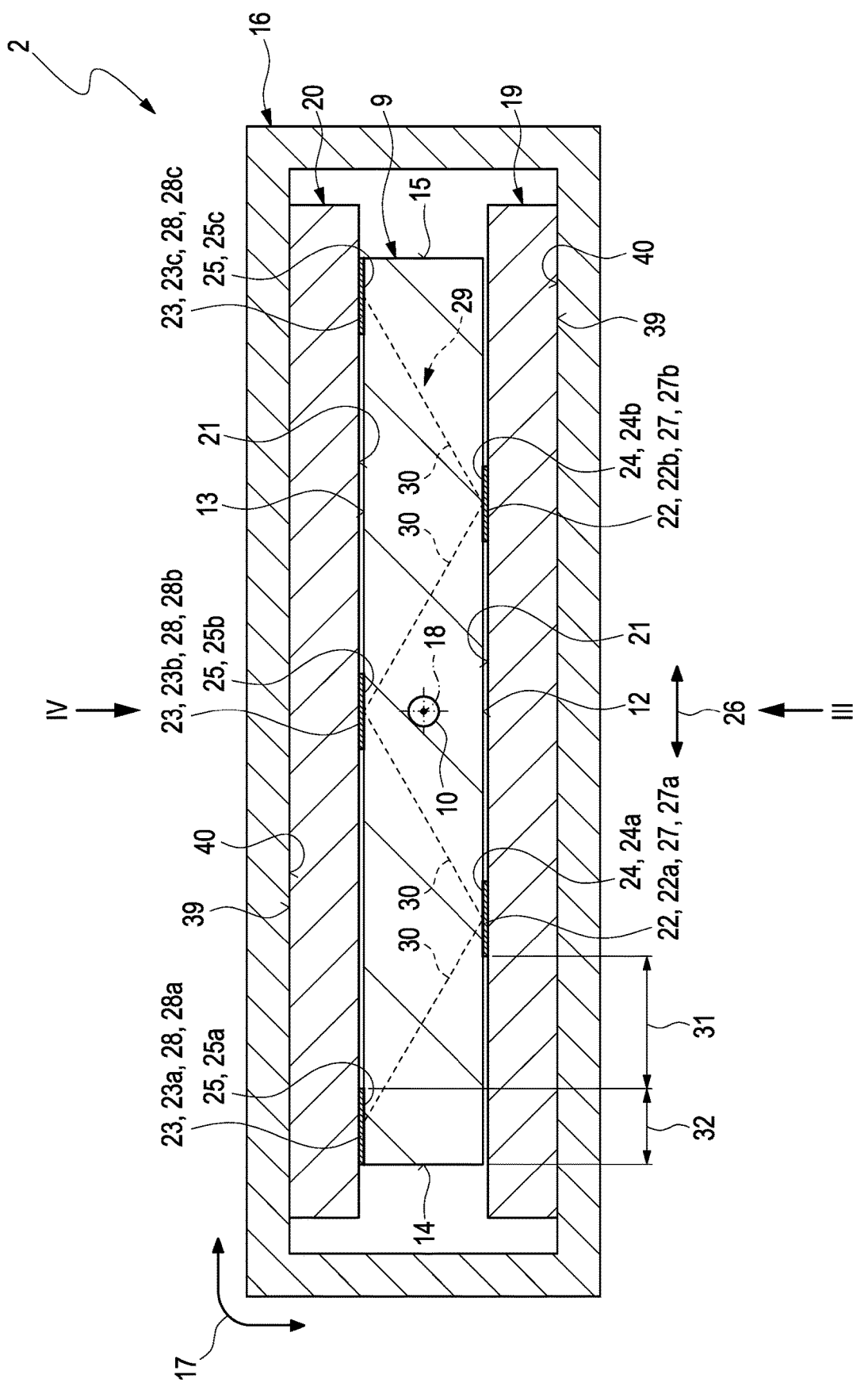
FIG. 2 shows a cross section through a PTC thermistor module in the region of a PTC thermistor element with insulator plates and enveloping body.

As can be gathered from FIGS. 2 and also 5 and 6, in particular, the respective PTC thermistor element 9 has a flat element cross section 11 transversely with respect to the module longitudinal direction 10, which runs perpendicular to the plane of the drawing in FIGS. 2 and also 5 and 6, said element cross section being configured as rectangular in the preferred examples shown. Along the module longitudinal direction 10, the respective PTC thermistor element 9 thus has two large outer surfaces 12, 13, namely a first large outer surface 12 and a second large outer surface 13, which face away from one another. Moreover, along the module longitudinal direction 10, the respective PTC thermistor element 9 thus has two small outer surfaces 14, 15, namely a first small outer surface 14 and a second small outer surface 15, which face away from one another. In this case, the two small outer surfaces 14, 15 connect the two large outer surfaces 12, 13. In examples shown, the large and small outer surfaces 12, 13, 14, 15 are embodied as planar in each case, such that the respective PTC thermistor element 9 is also configured as planar. Overall, the respective PTC thermistor element 9 in the examples shown is shaped in the manner of a flat parallelepiped.

As shown in the exemplary embodiments, the respective PTC thermistor element 9 can furthermore have an enveloping body 16. In this case, the enveloping body 16 encloses the respective PTC thermistor element 9 of the PTC thermistor module 2 at least in a peripheral direction 17. In this case, the peripheral direction 17 runs peripherally with respect to the module longitudinal direction 10 or with respect to a module longitudinal central axis 18. The enveloping body 16 is advantageously produced from a metal and thus has a high thermal conductivity and electricity conductivity.

The respective PTC thermistor module 2 additionally comprises two insulator plates 19, 20, namely a first insulator plate 19 and a second insulator plate 20. The insulator plates 19, 20 are electrically insulating and composed of ceramic, for example. The insulator plates 19, 20 extend in each case in the module longitudinal direction 10 and are respectively connected to an associated one of the large outer surfaces 12, 13 of the respective PTC thermistor element 9 in a heat-transferring manner. Expediently, the respective insulator plate 19, 20 bears on the entire respectively associated large outer surface 12, 13 of the respective PTC thermistor element 9 in a planar manner. In this case, a thermally conductive material (not shown), for example in the form of a paste or in the form of a film, can be arranged between the respective large outer surface 12, 13 and a plate inner side 21 facing the respective PTC thermistor element 9.

The respective PTC thermistor module 2 furthermore comprises, for the respective large outer surface 12, 13, electrical conductors 22, 23 for the electrical supply of the respective PTC thermistor element 9, namely at least one first electrical conductor 22 electrically connected to the first large outer surface 12, and also at least two electrical conductors 23 electrically connected to the second large outer surface 13. For better differentiation, hereinafter the conductors 22 electrically connected to the first large outer surface 12 are also referred to as lower conductors 22 and the conductors 23 electrically connected to the second large outer surface 13 are also referred to as upper conductors 23. The electrical conductors 22, 23 are in each case spaced apart from one another. The respective conductor 22, 23 here is electrically conductively connected to the associated large outer surface 12, 13 in an associated contact region 24, 25. As a result of the spaced-apart arrangement of the conductors 22, 23, the contact areas 24, 25 are also spaced apart from one another. Here all conductors 22, 23 in the exemplary embodiments shown are spaced apart from one another in a common spacing direction 26. Consequently, the contact regions 24, 25 are also spaced apart from one another in each case in the common spacing direction 26.

The respective conductor 22, 23 is embodied, in particular coated, as an electrically conductive coating 27, 28, also called conductor coating 27, 28 hereinafter, on an associated one of the insulator plates 19, 20. That is to say that the respective lower conductor 22 is embodied, in particular coated, as a conductor coating 27 on the first insulator plate 19, also called lower conductor coating 27 hereinafter, and the respective upper conductor 23 is embodied, in particular coated, as a conductor coating 28 on the second insulator plate 20, also called upper conductor coating 28 hereinafter. In this case, during operation, preferably, the lower conductor coatings 27 have a first electrical polarity, whereas the upper conductor coatings 28 have a second electrical polarity. On account of the conductor coatings 27, 28 being arranged in a manner spaced apart from one another and on account of the alternating arrangement on the first large outer surface 12 and the second large outer surface 13 and the same electrical polarity at the respective large outer surface 12, 13, the current path 29 indicated in the figures results, which runs in a zigzag fashion between the large outer surfaces 12, 13. The current path 29 thus has at least two successive sections 30 running in each case between the first large outer surface 12 and the second large outer surface 13. Consequently, during operation, an associated region having an increased temperature, also called a "hot spot", arises for the respective section 30, such that at least two hot spots spaced apart from one another arise in the PTC thermistor element 9 during operation. This has the effect that the PTC thermistor element 9 has a more homogeneous temperature distribution during operation. Moreover, avoiding a single local hot spot improves the efficiency of the respective PTC thermistor element 9, in particular even at elevated operating voltages, for example of hundreds of volts, in particular above 700 volts.

As can be gathered from FIGS. 2 and also 5 and 6, in particular, it is preferred if the conductor coatings 27, 28 succeeding one another in the spacing direction 26 each have a spacing 31 with respect to one another which is larger than the extent 32 of the respective conductor coatings 27, 28 in the spacing direction 26. In the exemplary embodiments shown, the conductor coatings 27, 28 succeeding one another in the spacing direction 26 here are arranged equidistantly with respect to one another. Moreover, the conductor coatings 27, 28 each have the same extent 32 in the spacing direction 26.

The respective PTC thermistor element 9 can have an associated metal coating 33 on the respective large outer surface 12, 13 in the region of the respectively associated conductor coating 27, 28, as can be gathered from FIGS. 3 and also 7 and 9, in particular. In the exemplary embodiments shown, the respective large outer surface 12, 13 has a respective metal coating 33 of this type exclusively in the region of the associated conductor coating 27, 28, i.e. in the respectively associated contact region 24, 25.

FIGS. 2 to 4 show a first exemplary embodiment of the PTC thermistor module 2, wherein FIG. 2 shows a cross section through the PTC thermistor module 2 in the region of one of the PTC thermistor elements 9. FIG. 3 shows a plan view of the PTC thermistor module 2 in the direction denoted III in FIG. 2, that is in the direction of the second insulator plate 20, wherein the first insulator plate 19 and the enveloping body 16 and also the electrical terminals 8 are not shown. FIG. 4 shows a plan view of the PTC thermistor module 2 in the direction denoted IV in FIG. 2 and thus in the direction of the first insulator plate 19, wherein the second insulator plate 20, the PTC thermistor elements 9 and also the enveloping body 16 and the terminals 8 are not shown.

In this exemplary embodiment, two lower conductors 22, namely a first lower conductor 22a and a second lower conductor 22b, are electrically connected at the respective first large outer surface 12 of the respective PTC thermistor element 9. That is, two lower conductor coatings 27, namely a first lower conductor coating 27a and a second lower conductor coating 27b, are electrically connected at the respective first large outer surface 12 of the respective PTC thermistor element 9. By contrast, the respective second large outer surface 13 of the respective PTC thermistor element 9 is electrically connected to three upper conductor coatings 23, namely to a first upper conductor coating 23a, a second upper conductors 23, namely to a first upper conductor 23a, a second upper conductor 23b and also a third upper conductor 23c. That is, three lower conductor coatings 28, namely a first upper conductor coating 28a, a second upper conductors 28b and also a third upper conductor 28c are each electrically connected to the second large outer surface 13. In the exemplary embodiment in FIGS. 2 to 4, the current path 29 thus has four sections 30, with the result that four hot spots (not shown) spaced apart from one another arise during operation. In this exemplary embodiment, the respective conductor coating 27, 28 runs along the module longitudinal direction 10 and is electrically connected to the respectively associated large outer surface 12, 13 of the respective PTC thermistor element 9. That is to say that each of the lower conductor coatings 27 is electrically connected to each of the first large outer surfaces 12 and each of the upper conductor coatings 28 is electrically connected to each of the second large outer surfaces 13.

The spacing direction 26 thus runs transversely or at an inclination, preferably transversely, with respect to the module longitudinal direction 10.

Figure 5:
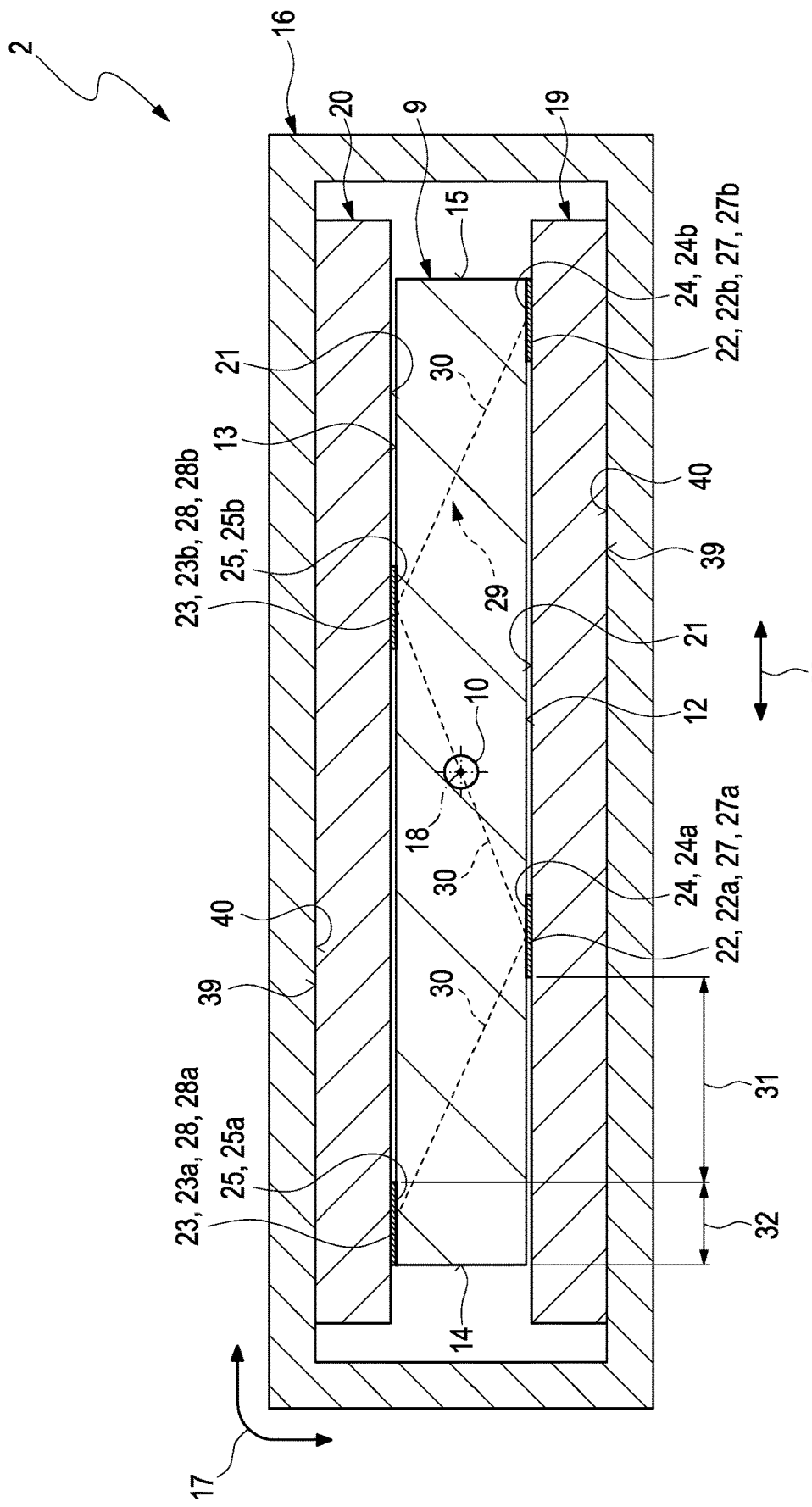
FIG. 5 shows the sectional view from FIG. 2 in the case of another exemplary embodiment.

FIG. 5 shows another exemplary embodiment of the PTC thermistor module 2, wherein the view from FIG. 2 can be seen. This exemplary embodiment differs from the exemplary embodiment shown in FIGS. 2 to 4 in that the respective large outer surface 12, 13 of the respective PTC thermistor element is electrically connected to two associated conductor coatings 27, 28 and thus two electrical conductors 22, 23. That is to say that the first large outer surface 12 is electrically connected to two lower conductor coatings 27, namely a first lower conductor coating 27*a* and a second lower conductor coating 27*b*. Moreover, the second large outer surface 13 is electrically connected to a first upper conductor coating 28*a* and a second upper conductor coating 28*b*. In the exemplary embodiment shown in FIG. 5, the current path 29 has three sections 30, with the result that three hot spots (not shown) spaced apart from one another arise during operation.

Figure 6:
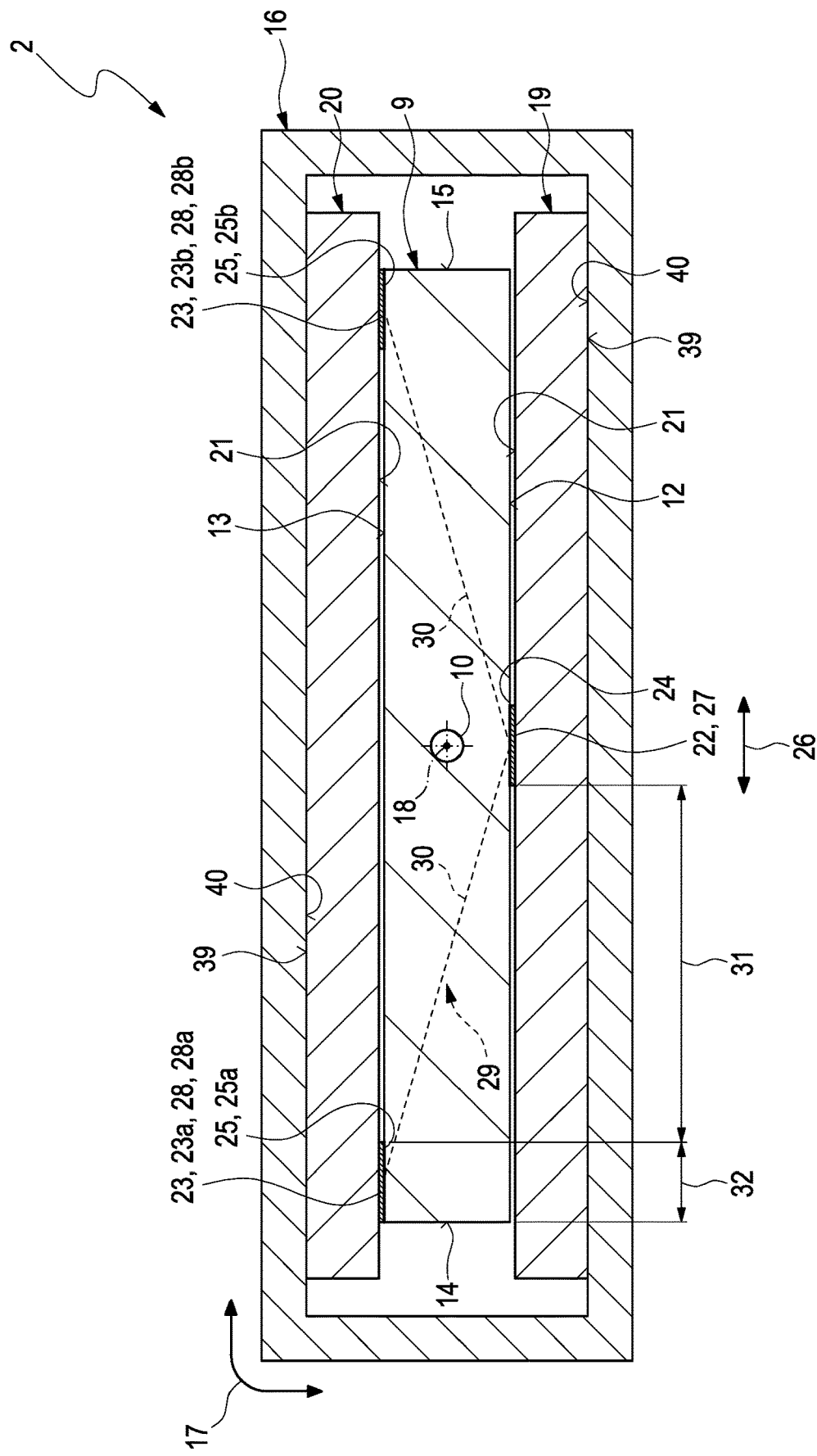
FIG. 6 shows the sectional view from FIG. 5 in the case of a further exemplary embodiment.

A further exemplary embodiment of the PTC thermistor module 2 is shown in FIG. 6, wherein the sectional view shown in FIG. 2 can be seen in FIG. 6. The exemplary embodiment shown in FIG. 6 differs from the exemplary embodiment shown in FIG. 2 in that just a single lower conductor coating 27 is electrically connected to the first large outer surface 12. By contrast, the second large outer surface 13 is electrically connected to two electrical conductor coatings 28, namely a first upper electrical conductor coating 28*a* and a second upper electrical conductor coating 28*b*. In the exemplary embodiment shown in FIG. 6, the current path 29 thus has two sections 30, with the result that two hot spots (not shown) spaced apart from one another arise during operation.

As can be gathered from FIGS. 7 and 8, the respective conductor coating 27, 28 can also run transversely or at an inclination with respect to the module longitudinal direction 10, wherein the conductor coatings 27, 28 in the exemplary embodiment in FIGS. 7 and 8 each run transversely with respect to the module longitudinal direction 10. In the exemplary embodiment shown in FIGS. 7 and 8, here respectively dedicated and associated conductor coatings 27, 28 are assigned to the respective large outer surface 12, 13 of the respective PTC thermistor element 9. In contrast to the exemplary embodiments shown in FIGS. 2 to 6, the spacing direction 26 thus runs in the module longitudinal direction 10. Here FIG. 7 shows, in a manner similar to FIG. 3, a plan view in the direction of the second insulator plate 20, wherein the first insulator plate 19 and also the enveloping body 16 are not shown. FIG. 8 shows a plan view in the direction of the first insulator plate 20, wherein the enveloping body 16, the second insulator plate 20 and also the PTC thermistor elements 9 are not shown. As shown by the joint consideration of FIGS. 7 and 8, in each case a lower conductor coating 27 and an upper conductor coating 28 connect PTC thermistor elements 9 to one another which are adjacent alternately in the longitudinal direction 10. In this case, the conductor coatings 27, 28 electrically connecting the adjacent PTC thermistor elements 9 to one another are larger than the other conductor coatings 27, 28 in the spacing direction 26. As can be gathered from FIGS. 7 and 8, the lower conductor coatings 27 project from an associated common base section 34, which is also referred to as lower base section 34 hereinafter. The lower base section 34 is electrically conductive and thus electrically connects the lower conductor coatings 27 projecting from the lower base section 34 to one another. The upper conductor coatings 28 project from an associated common base section 35, which is also referred to as upper base section 35 hereinafter. The upper base section 35 is electrically conductive and thus electrically connects the upper conductor coatings 28 to one another. In this case, the respective base section 34, 35 runs in the module longitudinal direction 10 and is spaced apart from the PTC thermistor elements 9. Furthermore, the respective base section 34, 35 is applied, in particular coated, as a coating 36 on the plate inner side 21 of the insulator plate 19, 20 associated with the associated conductor coatings 27, 28. Advantageously, the respective base section 34, 35 with the associated conductor coatings 27, 28 is applied, in particular coated, jointly on the plate inner side 21 of the associated insulator plate 19, 20.

Another exemplary embodiment of the PTC thermistor module 2 is shown in FIGS. 9 and 10, wherein FIG. 9 shows the view from FIG. 7 and FIG. 10 shows the view from FIG. 8. This exemplary embodiment differs from the exemplary embodiments shown in FIGS. 7 and 8 in that the PTC thermistor elements 9 are subdivided into two groups 37, 38, namely a first group 37 having at least one PTC thermistor element 9 and a second group 38 having at least one other PTC thermistor element 9. In the exemplary embodiment shown, each of the groups 37, 38 comprises four PTC thermistor elements 9. In this case, the upper conductor coatings 28 electrically connected to the second large outer surfaces 13 of the PTC thermistor elements 9 of the first group 37 are electrically isolated from the upper conductor coatings 28 electrically connected to the second large outer surfaces 13 of the PTC thermistor elements 9 of the second group 38. For this purpose, an associated first upper base section 35*a* is assigned to the upper conductor coatings 28 associated with the PTC thermistor elements 9 of the first group 37, said first upper base section being spaced apart and electrically isolated from a second upper base section 35*b* associated with the upper conductor coatings 28 of the PTC thermistor elements 9 of the second group 38. By contrast, the lower conductor coatings 27 of the first large outer surfaces 12 of the PTC thermistor elements 9 of both groups 37, 38 in the exemplary embodiment shown correspond to the configuration in accordance with FIG. 8 and are thus electrically connected to one another.

As can be gathered from the figures, in all the exemplary embodiments shown, one of the conductor coatings 27, 28 is arranged on the associated insulator plate 19, 20 only in a first edge region adjoining one of the small outer surfaces 14, 15, for instance the first smaller surface 14. Moreover, another of the conductor coatings 27, 28 is arranged on the associated insulator plate 19, 20 only in a second edge region adjoining the other small outer surface 14, 15, for instance the second smaller surface 15.

In the exemplary embodiments shown, the insulator plates 19, 20 are connected to the enveloping body 16 in a heat-transferring manner. For this purpose, a plate outer side 39 of the respective insulator plate 19, 20 facing away from the respective PTC thermistor element 9 is connected, in a planar and heat-transferring manner, to a body inner side 40 facing the respective PTC thermistor element 9.

The invention claimed is:

1. A PTC thermistor module for a temperature control device, comprising:
   at least one PTC thermistor element having a flat element cross section disposed transversely with respect to a module longitudinal direction and having, extending along the module longitudinal direction, two large outer surfaces, facing away from one another, and two small outer surfaces facing away from one another and connecting the two large outer surfaces to one another;

two electrically insulating insulator plates extending in the module longitudinal direction and respectively connected to one of the two large outer surfaces of the at least one PTC thermistor element in a heat-transferring manner;

a plurality of electrical conductors configured as a plurality of electrically conductive conductor coatings arranged spaced apart from one another and each disposed on an associated insulator plate of the two insulator plates;

wherein the plurality of electrical conductors includes at least three conductors; and wherein at least one first conductor coating of the plurality of conductor coatings is electrically connected to a first large outer surface of the two large outer surfaces and at least two second conductor coatings of the plurality of conductor coatings are electrically connected to a second large outer surface of the two large outer surfaces.

2. The PTC thermistor module according to claim 1, wherein the plurality of conductor coatings are electrically connected to one another such that the at least one first conductor coatings has a first electrical polarity during operation and the at least two second conductor coatings have a second electrical polarity during operation.

3. The PTC thermistor module according to claim 1, wherein the plurality of conductor coatings are arranged spaced apart from one another along an identical spacing direction.

4. The PTC thermistor module according to claim 1, wherein:
one of the plurality of conductor coatings is arranged on the associated insulator plate only in a first edge region, which adjoins one of the two small outer surfaces; and
another of the plurality of conductor coatings is arranged on the associated insulator plate only in a second edge region, which adjoins the other one of the two small outer surfaces.

5. The PTC thermistor module according to claim 1, wherein at least one of the plurality of conductor coatings extends in the module longitudinal direction.

6. The PTC thermistor module according to claim 1, wherein:
at least one of the plurality of conductor coatings extends transversely with respect to the module longitudinal direction;
at least two of the plurality of conductor coatings project from a common and electrically conductive base section and are electrically connected to one another; and
the base section is structured as a coating disposed on the associated insulator plate with the at least two of the plurality of conductor coatings.

7. The PTC thermistor module according to claim 1, wherein:
the at least one PTC thermistor element includes at least two PTC thermistor elements arranged into a first group and a second group, which are disposed spaced apart from one another; and
at least one of:
the at least one first conductor coatings of the first group is electrically isolated from the at least one first conductor coatings of the second group; and
the at least two second conductor coatings of the first group are electrically isolated from the at least two second conductor coatings of the second group.

8. The PTC thermistor module according to claim 1, wherein:
the at least one PTC thermistor element includes an associated electrically conductive metal coating disposed on one of the two large outer surfaces in a region of an associated conductor coating of the plurality of conductor coatings; and
the metal coating is electrically conductively connected to the associated conductor coating.

9. The PTC thermistor module according to claim 8, wherein the metal coating and the associated conductor coating are soldered to one another.

10. The PTC thermistor module according to claim 1, further comprising:
an enveloping body enclosing the at least one PTC thermistor element at least in a peripheral direction; and
at least one of the two insulator plates is thermally conductive and is connected in a planar and heat-transferring manner, via a plate outer side facing away from the at least one PTC thermistor element, to a body inner side of the enveloping body that faces the at least one PTC thermistor element.

11. A temperature control device for regulating a temperature of a fluid comprising at least one PTC thermistor module and a control device configured to electrically drive the at least one PTC thermistor module, the at least one PTC thermistor module including:
at least one PTC thermistor element having, extending along the module longitudinal direction, two opposing large outer surfaces and two opposing small outer surfaces connecting the two large outer surfaces to one another such that the at least one PTC thermistor element has a flat element cross section disposed transversely with respect to the module longitudinal direction;
two electrically insulating insulator plates extending in the module longitudinal direction and respectively connected in a heat-transferring manner to one of the two large outer surfaces of the at least one PTC thermistor element;
a plurality of electrical conductors configured as a plurality of electrically conductive conductor coatings arranged spaced apart from one another and each disposed on an associated insulator plate of the two insulator plates; and
wherein at least one first conductor coating of the plurality of conductor coatings is electrically connected to a first large outer surface of the two large outer surfaces and at least two second conductor coatings of the plurality of conductor coatings are electrically connected to a second large outer surface of the two large outer surfaces.

12. The temperature control device according to claim 11, wherein the at least one PTC thermistor module includes a plurality of PTC thermistor modules arranged next to one another in a heat exchanger region through which the fluid is flowable.

13. The temperature control device according to claim 12, wherein:
the plurality of PTC thermistor modules define a heat exchanger block through which the fluid is flowable; and
the control device is arranged laterally on the heat exchanger block.

14. The temperature control device according to claim 11, wherein the plurality of conductor coatings are electrically connected to one another such that, during operation, the at least one first conductor coating has a first electrical polarity and the at least two second conductor coatings have a second electrical polarity.

15. The temperature control device according to claim 11, wherein:
the plurality of conductor coatings are arranged spaced apart from one another along a common spacing direction; and
the common spacing direction extends perpendicular to the two small outer surfaces.

16. The temperature control device according to claim 11, wherein:
one of the plurality of conductor coatings is arranged on the associated insulator plate only in a first edge region, which adjoins one of the two small outer surfaces; and
another of the plurality of conductor coatings is arranged on the associated insulator plate only in a second edge region, which adjoins the other one of the two small outer surfaces.

17. The temperature control device according to claim 11, wherein each of the plurality of conductor coatings extends along the associated insulator plate in the module longitudinal direction.

18. The temperature control device according to claim 11, wherein:
at least one of the plurality of conductor coatings extends transversely with respect to the module longitudinal direction;
at least two of the plurality of conductor coatings project from a common electrically conductive base section and are electrically connected to one another; and
the base section is structured as a coating disposed on the associated insulator plate with the at least two of the plurality of conductor coatings.

19. The temperature control device according to claim 11, wherein:
the at least one PTC thermistor element includes an electrically conductive metal coating disposed on one of the two large outer surfaces in a region of an associated conductor coating of the plurality of conductor coatings; and
the metal coating is electrically conductively connected to the associated conductor coating.

20. The temperature control device according to claim 11, wherein:
the at least one PTC thermistor module further includes an enveloping body enclosing the at least one PTC thermistor element at least in a peripheral direction; and
at least one of the two insulator plates is thermally conductive and is connected in a planar and heat-transferring manner, via a plate outer side facing away from the at least one PTC thermistor element, to a body inner side of the enveloping body that faces the at least one PTC thermistor element.

* * * * *